(12) United States Patent
Cha et al.

(10) Patent No.: US 6,869,188 B2
(45) Date of Patent: Mar. 22, 2005

(54) DEVICE FOR PROJECTION DISPLAY

(75) Inventors: Young Chuel Cha, Daegu-si (KR); Kyong Soo Hwang, Daegu-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/251,966

(22) Filed: Sep. 23, 2002

(65) Prior Publication Data

US 2003/0058415 A1 Mar. 27, 2003

(30) Foreign Application Priority Data

Sep. 24, 2001 (KR) .................................. 10-2001-59118

(51) Int. Cl.$^7$ ...................... G03B 21/28; G03B 21/22; G03B 21/56; H04N 5/64
(52) U.S. Cl. .......................... 353/77; 353/119; 353/74; 359/460; 348/787
(58) Field of Search ................................. 359/456, 457, 359/453, 460, 454, 455; 353/119, 73, 93, 94, 37, 47, 50, 69, 70, 74–80; 349/5, 6; 348/744, 836, 843, 787–789, 794

(56) References Cited

U.S. PATENT DOCUMENTS

| | | | | |
|---|---|---|---|---|
| 4,135,784 A | * | 1/1979 | Larrick ....................... 359/449 |
| 4,439,027 A | * | 3/1984 | Shioda et al. ................. 353/77 |
| 5,004,336 A | * | 4/1991 | Saijo et al. .................. 353/122 |
| 5,235,362 A | * | 8/1993 | Kronbauer .................... 353/71 |
| 5,289,287 A | * | 2/1994 | Dargis et al. ................ 348/766 |
| 5,897,192 A | * | 4/1999 | Seufert ......................... 353/74 |
| 5,993,009 A | * | 11/1999 | Choate ......................... 353/80 |
| 6,129,553 A | * | 10/2000 | Tanaka ....................... 434/263 |
| 6,309,074 B1 | * | 10/2001 | Inbar et al. ................. 353/120 |
| 6,445,407 B1 | * | 9/2002 | Wright ......................... 348/51 |
| 6,661,473 B1 | * | 12/2003 | Teshima et al. ............. 348/787 |

* cited by examiner

Primary Examiner—Judy Nguyen
Assistant Examiner—Andrew Sever
(74) Attorney, Agent, or Firm—Birch, Stewart, Kolasch & Birch, LLP

(57) ABSTRACT

A projection display device that is more compactly composed as compared with a conventional device by reducing the total width of a device, that is, the length between the rear of outer case and screen. The projection display device comprises an optical engine for projecting a light beam; a projection lens for magnifying and projecting the light beam projected by the optical engine; a reflection mirror for reflecting the light beam, magnified and projected through the projection lens, on the full screen of a screen; a screen for realizing an image using the light beam reflected by the reflection mirror; and a lower cabinet for supporting the screen, wherein a part of the optical engine mounted in the lower cabinet is protruded by a predetermined length in front as compared with the screen.

15 Claims, 3 Drawing Sheets

Dashed Lines Indicate the Related Art, and Solid Lines Indicate the Present Invention

DEVICE FOR PROJECTION DISPLAY

BACKGROUND OF THE INVENTION

1. Field of the Invention

The present invention relates to a projection display device, and more particularly to a projection display device that is more compactly composed as compared with a conventional device by reducing the total width of a device, that is, the length between the rear of outer case and screen.

2. Description of the Related Art

Generally, a projection display device is a display system where a small image is implemented on a separate plane (screen) in a large screen by magnifying and projecting the small image through an optical lens (optical engine or projection lens).

The configuration of a projection television (hereinafter, a display device) capable of implementing this system will be described in the following.

FIG. 1 is a cross-sectional view illustrating the configuration of the conventional projection display device.

As shown in FIG. 1, the projection display device 1 comprises an optical engine 2 for projecting an electron beam, a projection lens 3 for magnifying and projecting the electron beam projected by the optical engine 2, a reflection mirror 4 for reflecting the electron beam magnified and projected through the projection lens 3 on the full screen of a screen 5, and the screen 5 for realizing an image using the electron beam reflected by the reflection mirror 4.

Here, the optical engine 2 and the projection lens 3 are mounted in a lower cabinet 7 of an outer case 6, the reflection mirror 4 is mounted on the rear of an upper cabinet 8 of the outer case 6 for reflecting the electron beam magnified and projected through the projection lens 3 in the direction of the screen 5, and the screen 5 is mounted on the front of the outer case 6, the direction of which is opposite to the direction of the reflection mirror 4, so as to realize the electron beam reflected by the reflection mirror 4 on the full screen of the screen 5.

The image realization of the projection display device 1 composed like above configuration will be described.

First, when an electron beam for realizing an image is projected by the optical engine 2, the electron beam is magnified by the projection lens 3 mounted on the top of the optical engine 2 and projected to the full surface of the reflection mirror 4 mounted on the rear of the upper cabinet 8 of the outer case 6, and the magnified and projected electron beam is reflected to the full screen of the screen 5 mounted on the front of the outer case 6, the direction of which is opposite to the direction of the reflection mirror 4, by the reflection mechanism of the reflection mirror 4 and realized on the screen 5 as an image.

However, as the optical engine 2 and the projection lens 3 is mounted in the lower cabinet 7 of the outer case 6 in a limited space, the projection angle of the electron beam magnified and projected by the optical engine 2 and the projection lens 3 has a limitation in a range.

Like this, since the projection angle of the electron beam is limited in the range, the reflection mirror is greatly inclined to the screen 5 for reflecting the beam magnified and projected through the projection lens 3 on the full screen of the screen 5.

Namely, the reflection mirror 4 has a reflection angle corresponding to the angle of magnification and projection of the electron beam, and thereby reflects the magnified and projected electron beam on the full screen of the screen 5. As a result, the mounting position of the screen 5 becomes naturally distant in accordance with the mounting angle of the reflection mirror 4.

Further, owing to the TCL (Total Conjugate Length), which is the projection length of the reflected electron beam, depending on the size of the screen, if large screen for realization is desired, the reflection mirror 4 is required to be more distant from the screen 5 in a distance in order to project the electron beam reflected by the reflection mirror 4 on the full screen of the screen 5.

As a result, because of the distance between the reflection mirror 4 and the screen 5, there is a problem that total width D of the display device 1, that is, the length between the rear of the outer case 6 and surface of the screen 5 becomes so longer than the size of the screen 5 that the compact configuration of the projection display device 1 can not be obtained.

In particular, although the projection display has high quality image and high resolution as compared with PDP TV or LCD TV, the thickness, that is, the total width of the display device becomes lengthened, thus resulting in some problems of the beauty of the device or space application.

SUMMARY OF THE INVENTION

An object of the present invention is to substantially obviate the problems caused by limitations of the related art.

Namely, it is object of the present invention to provide a projection display device that has a more compact configuration than a conventional projection display device by protruding parts of the lower cabinet and the optical engine mounted at the lower cabinet by a predetermined length in front as compared with the screen, thereby reducing the total width of the display device due to the reduction of the distance between the reflection mirror and the surface of the screen.

According to the preferred embodiment of the present invention, the projection display device comprises an optical engine for projecting an electron beam; a projection lens for magnifying and projecting the electron beam projected by the optical engine; a reflection mirror for reflecting the electron beam, magnified and projected through the projection lens, on the full screen of a screen; a screen for realizing an image using the electron beam reflected by the reflection mirror; and a lower cabinet for supporting the screen, wherein a part of the optical engine mounted in the lower cabinet is protruded by a predetermined length in front as compared with the screen.

The optical engine, to which the projection lens is mounted, can be also protruded in front so far as the interference of the magnified and projected light from the projection lens to the reflection lens is not produced.

Further, the TCL of the projection display device is equal to that of the conventional projection display device.

The total width of the display device can be also reduced in a degree equal to the movement distance of the optical engine.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the preferred embodiment of the present invention will be described with reference to the accompanying Figures.

Figure 1:
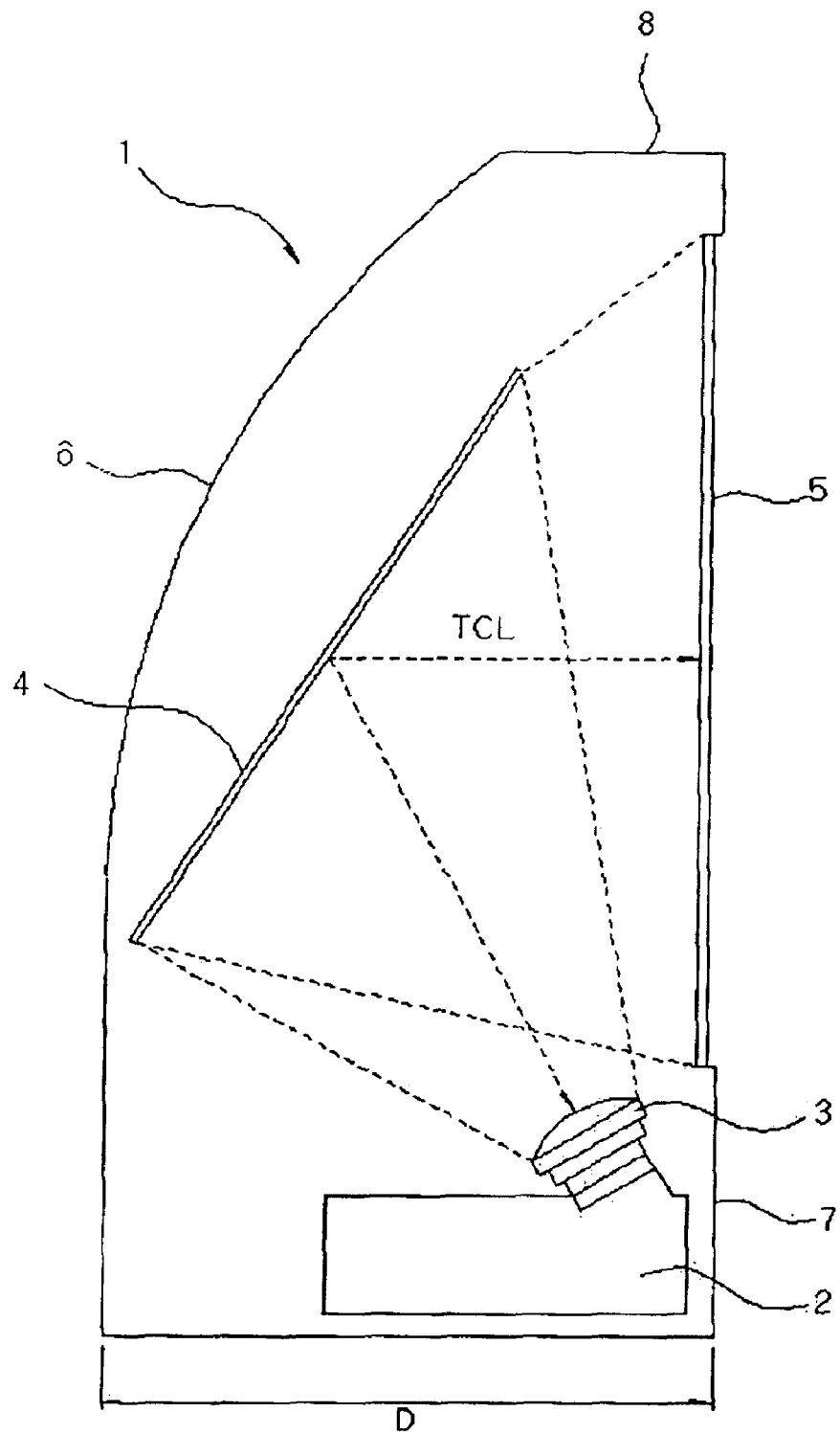
FIG. 1 is a cross-sectional view illustrating the configuration of the conventional projection display device.
Figure 2:
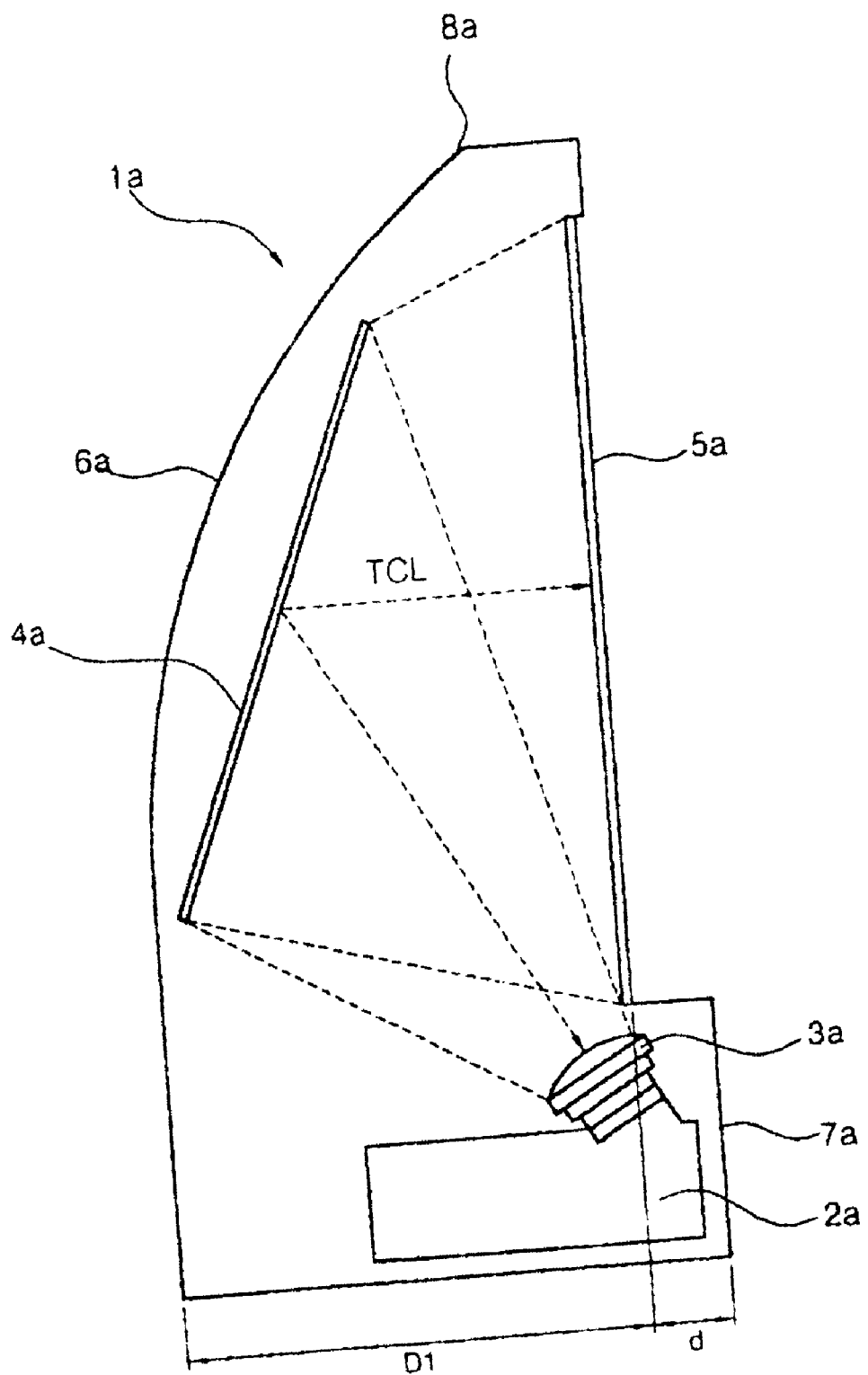
FIG. 2 is a cross-sectional view illustrating the configuration of the projection display device according to the present invention.

FIG. 2 is a cross-sectional view illustrating the configuration of the projection display device according to the present invention.

As shown in FIG. 2, the projection display device 1a according to the present invention comprises an optical engine 2a for projecting an electron beam, a projection lens 3a for magnifying and projecting the electron beam projected by the optical engine 2a, a reflection mirror 4a for reflecting the electron beam magnified and projected through the projection lens 3a on the full screen of a screen 5a, and the screen 5a for realizing an image using the electron beam reflected by the reflection mirror 4a. Here, 2a and 3a respectively designate the optical engine and the projection lens mounted with protrusion by a length d in front as compared with the screen 5a, 4a designates the reflection mirror mounted with an angle of reflection above that of the conventional reflection mirror, and 5a designates the screen where the distance to the reflection mirror 4a reduces due to the reflection mirror 4a.

In particular, the present invention provides a projection display device where parts of the lower cabinet 7a which is the lower part of the projection display device 1a, and the optical engine 2a mounted in the lower cabinet 7a are protruded by a length d in front as compared with the screen 5a. Here, the length d is the maximum length where the optical engine 2a can be moved in front as compared with the screen 5a without the interference of light from the screen 5a.

Further, when a part of the optical engine 2a is protruded by a length d in front as compared with the screen 5a, the reflection angle of the reflection mirror 4a can be bigger than the corresponding reflection angle of the electron beam of the reflection mirror 4 mounted in the conventional projection display device 1 for corresponding the projection angle of the electron beam magnified and projected by the optical engine 2a and the projection lens 3a protruded in front as compared with the screen 5a.

Figure 3:
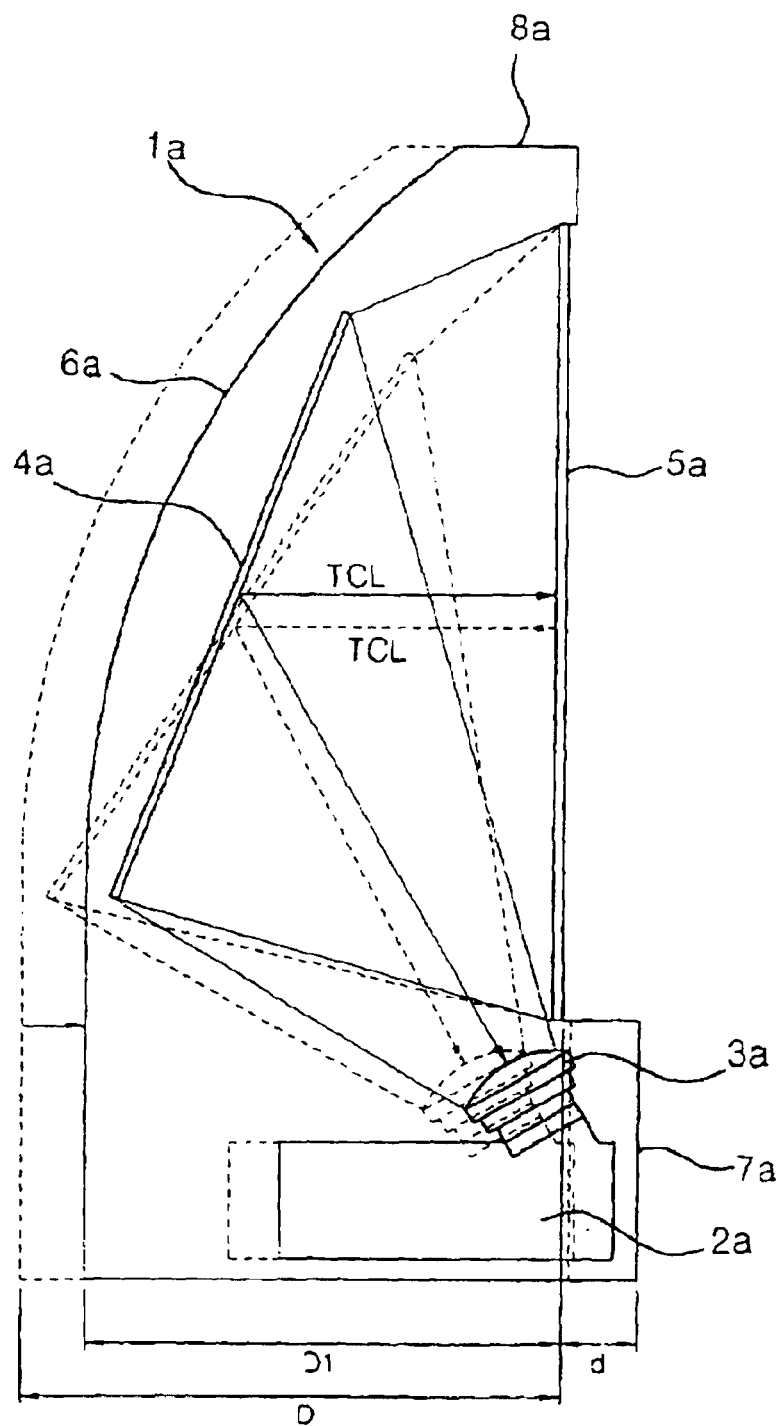
FIG. 3 is a cross-sectional view illustrating an arrangement comparison of a reflection mirror and an optical engine that are elements of the projection display device according to the present invention and the conventional projection display device.

Namely, while the reflection mirror 4a is mounted with close inclination to the upper cabinet 8a of the outer case, in the distance from the screen 5a for realizing an image by projecting the electron beam reflected by the reflection mirror 4a the outer case 6a of the present invention is mounted with a reduction in a degree, as compared with that of the conventional display device 1, as shown in FIG. 3.

Furthermore, in the projection display device of the present invention, a part of the optical engine is maximally moved in front as compared with the screen in a limitation that interference of light from the screen is not produced, without changing the TCL (Total Conjugate Length), thus resulting in reduction of the length of the conventional projection display device.

Here, TCL is the projection length of the reflected electron beam, that is, the total movement length of the electron magnified and projected by the optical engine 2a and the projection lens 3a to the full screen of the screen 5a through the reflection 4a.

As described above, the reduction of the width of the projection display device can be also achieved by reducing the projection length of the reflected electron beam.

However, as it is difficult with technique to reduce the TCL, the reduction of the width of the projection display device can be easily achieved if a part of the optical engine is maximally moved in front as compared with the screen without the variation of the TCL.

Moreover, constant distance can be remain in typical TV watching. Likewise, front space of TV, more particularly lower part of screen, that is, lower cabinet part can be utilized as dead angle zone by arranging no device in front of TV screen.

Thus, the limitation of external appearance can be easily overcome through a compact configuration that a part of the optical engine is maximally moved in front as compared with the screen without interference from the screen to reduce the length of the projection display device.

While the image realization of the projection display device 1a according to the present invention is equal to that of the conventional projection display device 1, the method for the image realization of the projection display device 1a according to the present invention will be omitted.

The configuration of the present invention will be more apparent after comparing the configuration of the projection display device of the present invention with that of the conventional projection display device.

Accordingly, arrangements of the reflection mirror and the optical engine that are elements of the projection display device of the present invention and the conventional projection display device will be described with following comparison.

FIG. 3 is a cross-sectional view illustrating the arrangement comparison of a reflection mirror and an optical engine that are elements of the projection display device of the present invention and the conventional projection display device.

First, as shown in FIG. 3, outer case (solid line) of the present invention is generally mounted with reduction of distance to the screen 5a as compared with that (dotted line) of the conventional projection display device 1.

In particular, the optical engine mounted in the lower cabinet 7a is so configured in front (that is, protruding by a length d), as compared with the screen surface 5, 5a, that the width D1 of the display device 1a of the present invention, that is, the length from the outer case 6a of the display device 1a to the screen 5a can be reduced as compared with the width D of the conventional display device 1.

Therefore, the projection display device 1a of the present invention can be more compactly configured than the conventional projection display device 1.

On the other hand, the TCL of the projection display device 1a of the present invention is substantially equal to the TCL of the conventional projection display device 1.

Namely, while a reflection length from the reflection mirror 4a to the screen 5a is reduced because of the relative reduction of the width of the projection display device 1a of the present invention, the distance from the projection lens 3a to the reflection mirror 5a is so increased as a degree of reduction that the total projection length of the reflected electron beam is equal to that of the conventional device.

As described above, in the projection display device 1a according to the present invention, as the lower cabinet 7a and the optical engine 2a mounted in the lower cabinet 7a is configured in front of the screen 5a the length from the reflection mirror 4a to the screen 5a due to the reflection angle is reduced by forming a large reflection angle of the reflection mirror 4a for reflecting the electron beam projected by the optical engine 2a to the screen 5a.

As a result, the projection display device of the present invention can be more compactly configured than the conventional projection display device by reducing the total width of the display device.

Particularly, the beauty of the device in appearance can be enhanced by utilizing the dead angle zone such as lower part of the screen, that is, lower cabinet part without the variation of the TCL.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A projection display device, comprising:
   an optical engine for projecting a light beam;
   a projection lens for magnifying and projecting the light beam projected by the optical engine;
   a reflection mirror for reflecting the light beam, magnified and projected through the projection lens;
   a screen for realizing an image using the light beam reflected by the reflection mirror; and
   a lower cabinet for supporting the screen, wherein a part of the optical engine mounted in the lower cabinet, including part of the projection lens, is protruded by a predetermined length in front of the screen, wherein a total width of the display device can be reduced in a degree corresponding to the movement distance of the optical engine.

2. The projection display device according to claim 1, wherein the optical engine, to which the projection lens is mounted, is protruded by a length in front of the screen up to a point just prior to where interference of the magnified and projected light from the projection lens with light from the screen occurs.

3. The projection display device according to claim 1, wherein the total conjugate length of the projection display device is equal to that of a conventional projection display device.

4. The projection display device according to claim 1, wherein the screen lies in a plane, the reflection mirror resides on a first side of the plane, and the optical engine resides, at least partially, on a second side of the plane.

5. The projection display device according to claim 1, wherein the screen lies in a plane, the reflection mirror resides on a first side of the plane, and the projection lens resides, at least partially, on a second side of the plane.

6. The projection display device according to claim 1, wherein the optical engine, to which the projection lens is mounted, is protruded by a length in front of the screen up to a point just prior to where the magnified and projected light from the projection lens interferes with light reflected from the screen, as the light travels toward the reflection mirror.

7. A projection display device, comprising:
   an optical engine for projecting a light beam;
   a projection lens for magnifying and projecting the light beam projected by the optical engine;
   a reflection mirror for reflecting the light beam, magnified and projected through the projection lens;
   a screen for realizing an image using the light beam reflected by the reflection mirror; and
   a lower cabinet for supporting the screen, wherein a part of the optical engine mounted in the lower cabinet is protruded by a predetermined length in front of the screen, wherein the screen lies in a plane, the reflection mirror resides on a first side of the plane, and the projection lens resides, at least partially, on a second side of the plane.

8. The projection display device according to claim 7, wherein the optical engine, to which the projection lens is mounted, is protruded by a length in front of the screen up to a point just prior to where interference of the magnified and projected light from the projection lens with light from the screen occurs.

9. The projection display device according to claim 7, wherein the total conjugate length of the projection display device is equal to that of a conventional projection display device.

10. The projection display device according to claim 7, wherein the screen lies in a plane, the reflection mirror resides on a first side of the plane, and the optical engine resides, at least partially, on a second side of the plane.

11. The projection display device according to claim 7, wherein the optical engine, to which the projection lens is mounted, is protruded by a length in front of the screen up to a point just prior to where the magnified and projected light from the projection lens interferes with in the screen, as the light travels toward the reflection mirror.

12. A projection display device, comprising:
   an optical engine for projecting a light beam;
   a projection lens for magnifying and projecting the light beam projected by the optical engine;
   a reflection mirror for reflecting the light beam, magnified and projected through the projection lens;
   a screen for realizing an image using the light beam reflected by the reflection mirror; and
   a lower cabinet for supporting the screen, wherein a part of the optical engine mounted in the lower cabinet is protruded by a predetermined length in front of the screen, wherein the optical engine, to which the projection lens is mounted, and a portion of the projection lens, are protruded by a length in front of the screen up to a point just prior to where interference of the magnified and projected light from the projection lens with light reflected by the screen occurs.

13. The projection display device according to claim 12, wherein the total conjugate length of the projection display device is equal to that of a conventional projection display device.

14. The projection display device according to claim 12, wherein the screen lies in a plane, the reflection mirror resides on a first side of the plane, and the optical engine resides, at least partially, on a second side of the plane.

15. The projection display device according to claim 12, wherein the length to which the optical engine is protruded in front of the screen is a point just prior to where the magnified and projected light from the projection lens interferes with the light reflected from the screen, as the light travels toward the reflection mirror.

* * * * *